(12) United States Patent
Paul, Jr.

(10) Patent No.: US 7,699,928 B2
(45) Date of Patent: Apr. 20, 2010

(54) SPRAYABLE AND PUMPABLE PHOSPHATE CEMENT

(75) Inventor: James W. Paul, Jr., Mechanicsville, VA (US)

(73) Assignee: Grancrete, Inc., Cary, NC (US)

( * ) Notice: Subject to any disclaimer, the term of this patent is extended or adjusted under 35 U.S.C. 154(b) by 0 days.

(21) Appl. No.: 11/776,172

(22) Filed: Jul. 11, 2007

(65) Prior Publication Data

US 2008/0011200 A1   Jan. 17, 2008

Related U.S. Application Data

(60) Provisional application No. 60/831,069, filed on Jul. 14, 2006.

(51) Int. Cl.
*C04B 12/02* (2006.01)

(52) U.S. Cl. ...................... 106/691; 106/690

(58) Field of Classification Search .............. 106/690, 106/691
See application file for complete search history.

(56) References Cited

U.S. PATENT DOCUMENTS

| | | |
|---|---|---|
| 3,879,209 A | 4/1975 | Limes et al. |
| 3,960,580 A | 6/1976 | Stierli et al. |
| 4,504,555 A | 3/1985 | Prior et al. |
| 4,541,870 A | 9/1985 | Barrett, Jr. |
| 4,842,649 A | 6/1989 | Heitzmann et al. |
| 4,956,321 A | 9/1990 | Barrall |
| 5,002,610 A | 3/1991 | Sherif et al. |
| 5,080,022 A | 1/1992 | Carlson |
| 5,114,617 A | 5/1992 | Smetana et al. |
| 5,311,945 A | 5/1994 | Cowan et al. |
| 5,597,120 A | 1/1997 | Chess, Jr. |
| 5,645,518 A | 7/1997 | Wagh et al. |
| 5,718,757 A | 2/1998 | Guillou et al. |
| 5,788,762 A | 8/1998 | Barger et al. |
| 5,830,815 A | 11/1998 | Wagh et al. |
| 5,846,894 A | 12/1998 | Singh et al. |
| 6,136,088 A | 10/2000 | Farrington |
| 6,153,809 A | 11/2000 | Singh et al. |
| 6,204,214 B1 | 3/2001 | Singh et al. |
| 6,264,740 B1 | 7/2001 | McNulty, Jr. |
| 6,290,769 B1 | 9/2001 | Carkner |
| 6,458,423 B1 | 10/2002 | Goodson |
| 6,475,275 B1 | 11/2002 | Nebesnak et al. |
| 6,498,119 B2 | 12/2002 | Wagh et al. |
| 6,518,212 B1 | 2/2003 | Wagh et al. |
| 6,561,269 B1 | 5/2003 | Brown et al. |
| 6,719,993 B2 | 4/2004 | Constantz |
| 6,776,837 B2 | 8/2004 | Wagh et al. |
| 6,783,799 B1 | 8/2004 | Goodson |
| 6,790,815 B1 | 9/2004 | Bettiol et al. |
| 7,045,476 B1 * | 5/2006 | Lally ......................... 501/111 |
| 7,160,383 B2 | 1/2007 | Wagh et al. |
| 7,204,880 B1 | 4/2007 | Turner et al. |
| 7,288,148 B2 | 10/2007 | Hicks et al. |
| 7,429,290 B2 * | 9/2008 | Lally ....................... 106/18.14 |
| 2002/0009622 A1 | 1/2002 | Goodson |
| 2003/0041785 A1 | 3/2003 | Harrison |
| 2003/0127025 A1 | 7/2003 | Orange et al. |
| 2003/0131759 A1 | 7/2003 | Francis et al. |
| 2004/0194657 A1 * | 10/2004 | Lally ....................... 106/18.12 |
| 2005/0000393 A1 | 1/2005 | Virtanen |
| 2005/0016421 A1 | 1/2005 | Fujimori et al. |
| 2005/0160944 A1 | 7/2005 | Wagh et al. |
| 2005/0229809 A1 * | 10/2005 | Lally ....................... 106/18.14 |
| 2005/0274290 A1 | 12/2005 | Wagh et al. |

FOREIGN PATENT DOCUMENTS

WO    WO 02/24598 A2    3/2002

OTHER PUBLICATIONS

Notification of Transmittal of the International Search Report and the Written Opinion of the International Searching Authority, or the Declaration corresponding to PCT/US2007/015856 mailed Nov. 27, 2007.

* cited by examiner

*Primary Examiner*—Anthony J Green
(74) *Attorney, Agent, or Firm*—Myers Bigel Sibley & Sajovec, PA

(57) ABSTRACT

A sprayable and pourable cement composition is provided. The cement composition comprises about 30 to 40 percent by weight calcium silicate, about 20 to 35 percent by weight magnesium oxide and about 25 to 45 percent by weight monopotassium phosphate.

8 Claims, 2 Drawing Sheets

SPRAYABLE AND PUMPABLE PHOSPHATE CEMENT

CROSS-REFERENCE TO RELATED APPLICATION

This application claims priority to U.S. Provisional Application Ser. No. 60/831,069, filed Jul. 14, 2006, the disclosure of which is incorporated by reference in its entirety.

FIELD AND BACKGROUND OF THE INVENTION

The present invention relates generally to a phosphate cement composition, and more particularly to a sprayable and pumpable phosphate cement composition that cures rapidly, and is flame and heat resistant.

Portland cement has traditionally been the cement of choice. It is typically a mixture of water, calcined lime and silica. It is cheap to produce, easy to handle. There are, however, several disadvantages to Portland cement. Source materials often have inconsistent quality. Portland cement is often highly viscous which is acceptable for pouring and spreading, but is a major disadvantage if pumping or spraying is desired. Portland cement also has a slow cure rate.

An alternative to Portland cement is phosphate cement. Phosphate cement typically comprises an acid component such as phosphoric acid or an alkaline earth phosphate salt (e.g., magnesium phosphate), and a base component such as magnesium oxide. Phosphate cements tend to cure rapidly, and have excellent chemical stability and compressive strength. Due to the rapid cure characteristic, phosphate cements are, however considered undesirable for spraying and pumping.

SUMMARY OF THE INVENTION

A sprayable and pourable cement composition is provided. The cement composition comprises about 30 to 40 percent by weight calcium silicate, about 20 to 35 percent by weight magnesium oxide and about 25 to 45 percent by weight monopotassium phosphate.

DETAILED DESCRIPTION OF THE INVENTION

Figure 1:
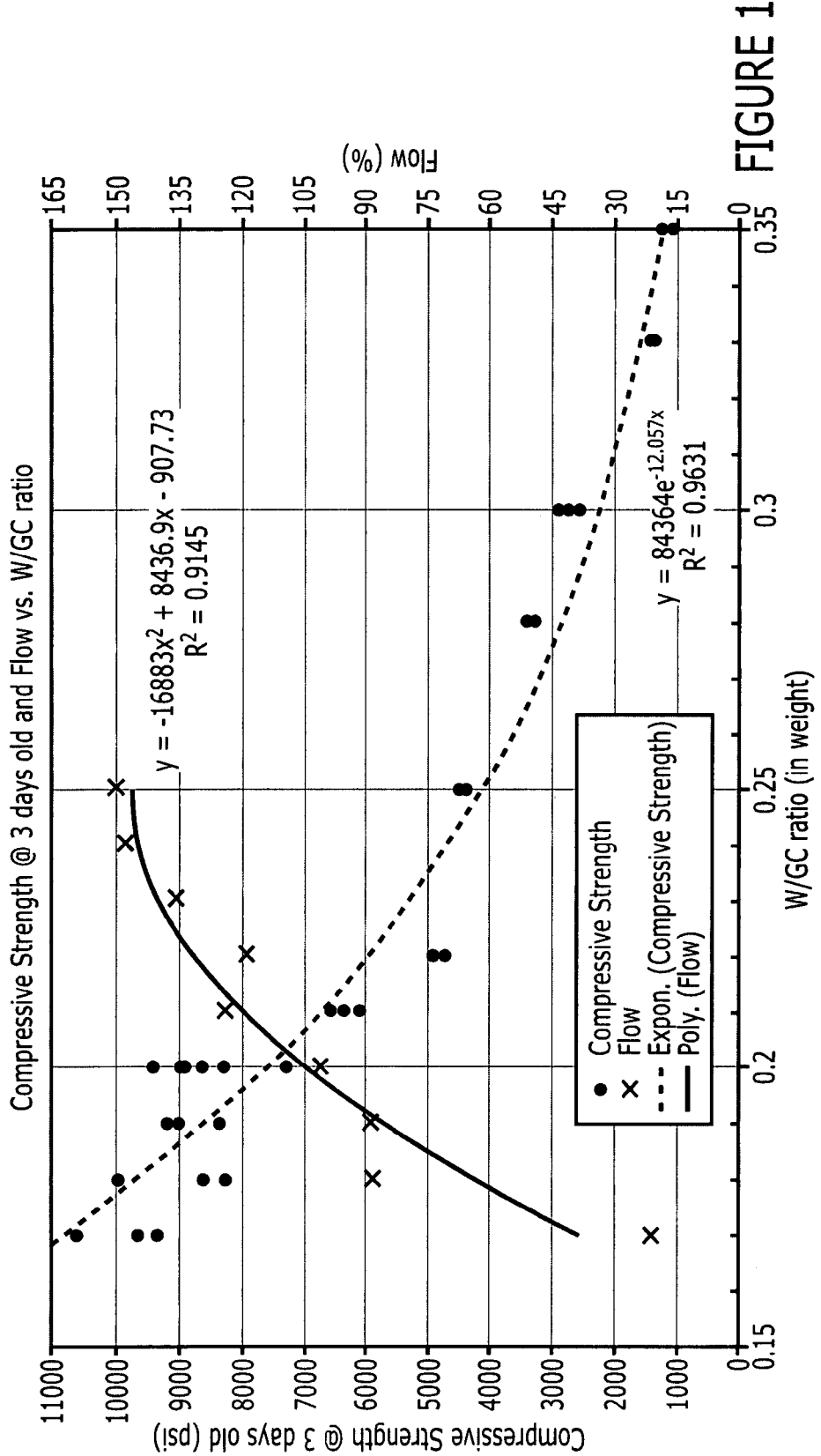
FIG. 1 is a graph of compressive strength versus flowability based on water ratios of the mixture of the Example.

The foregoing and other aspects of the present invention will now be described in more detail with respect to other embodiments described herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items. Furthermore, the term "about," as used herein when referring to a measurable value such as an amount of a compound, dose, time, temperature, and the like, is meant to encompass variations of 20%, 10%, 5%, 1%, 0.5%, or even 0.1% of the specified amount. Unless otherwise defined, all terms, including technical and scientific terms used in the description, have the same meaning as commonly understood by one of ordinary skill in the art to which this invention belongs.

The phosphate cement composition of the present invention has a short cure time, is sprayable and pourable, is a barrier to moisture, has high compressive strength and flexural strength as compared to Portland cement, is resistant to corrosion from salt and can withstand heat exceeding 2200° F. with no loss of other properties.

The composition comprises calcium silicate (wollastonite), magnesium oxide and monopotassium phosphate. In one embodiment, the composition comprises about 30 to 40 percent by weight calcium silicate, about 20 to 35 percent by weight magnesium oxide and about 25 to 45 percent by weight monopotassium phosphate. A mixture of the above can be made into a slurry using 17 to 35 pounds of composition per 100 pounds of dry mix depending on the desired flowability.

The resulting phosphate cement composition is sprayable and pumpable. It has a short cure time of 5 to 15 minutes depending on ambient temperature and amount of water used. The phosphate cement composition of the invention adheres to most other materials. Thus suitable substrates include other cements (Portland and phosphate), brick, rock, metals, wood, insulation foam materials, asphalt, roofing materials, cloth/textile materials (including carpets, burlap, canvas), straw materials, drywall/gypsum, The material also bonds to itself. This allows thickness to be increased as well as repairs to existing material without having a seam or joint.

The phosphate cement composition can be applied by spraying or pumping horizontally or vertically. The composition can be applied to a wide variety of substrates and can be used, for example, for coating walls, floors, roads, road repairs, columns, pools, roofs, levees, bridges, patios, driveways, furniture, domes, retaining walls, and the like. The composition can be applied in structured forms to create landscape/hardscape items, walkways, furniture, pipes, counter tops, statues and other useful items. This composition can also be used to safely encase hazardous materials such as mold infested walls/floors and asbestos treated buildings and areas, and hazardous waste materials.

Suitable additives may be mixed with the phosphate cement composition and typically the amounts added may be from about 0.1 to about 30 percent by weight. Exemplary additives include flame retardants, fibers, emulsifiers, deflocculates, sequestrates, accelerators (e.g. Accelguard available from The Euclid Chemical Company, Cleveland, Ohio) colorants and pigments, fillers, aggregates, borax, silica materials, iron oxides, bonding adhesives (e.g., Eucopoxy Resin and Eucoweld available from The Euclid Chemical Company, Cleveland, Ohio, Flexcon, and Corr-bond) plasticizers, hardeners (e.g., Euco Diamond Hard available from The Euclid Chemical Company, Cleveland, Ohio), patching polymers (e.g., Eucorapid patch available from The Euclid Chemical Company, Cleveland, Ohio), micro silica fume (e.g., Eucoshot available from The Euclid Chemical Company, Cleveland, Ohio), setting retarders, surface softeners, and kaolins, curing compounds (e.g., Brownstone CS), water reducers (e.g., Accelguard, Eucon AC), and air entrainers (e.g., AEA and Air Mix).

The following example is merely illustrative of the invention, and is not limiting thereon.

EXAMPLE

A composition comprising 34 percent monopotassium phosphate, 30 percent magnesium oxide and 36 percent wollastonite was prepared in slurry form using 18 pounds of composition per 50 pounds of dry mix. Compression strength was measured using the ASTM C109 protocol.

TABLE 1

| Compressive Strength | |
|---|---|
| 1 hour | 4930 psi |
| 3 days | 5620 psi |
| 7 days | 6280 psi |

Portland cement is typically 2500-3500 psi after 7 days thus there is improved compressive strength.

Compressive strength (ASTM C109) compared to Flowability (ASTM C1437) based on water ratios of the composition was also compared. (See, FIG. 1.) The results demonstrate the composition can be mixed with 15% to 21% water ratios and have high compressions strengths (~10000 psi). Water ratios less than 21% show decreasing compression strengths resulting in ~1200 psi at 35%. The preferred flowability in the industry is ~105% which is where the data curves cross ~20% flowability and ~8000 psi compression strength.

Figure 2:
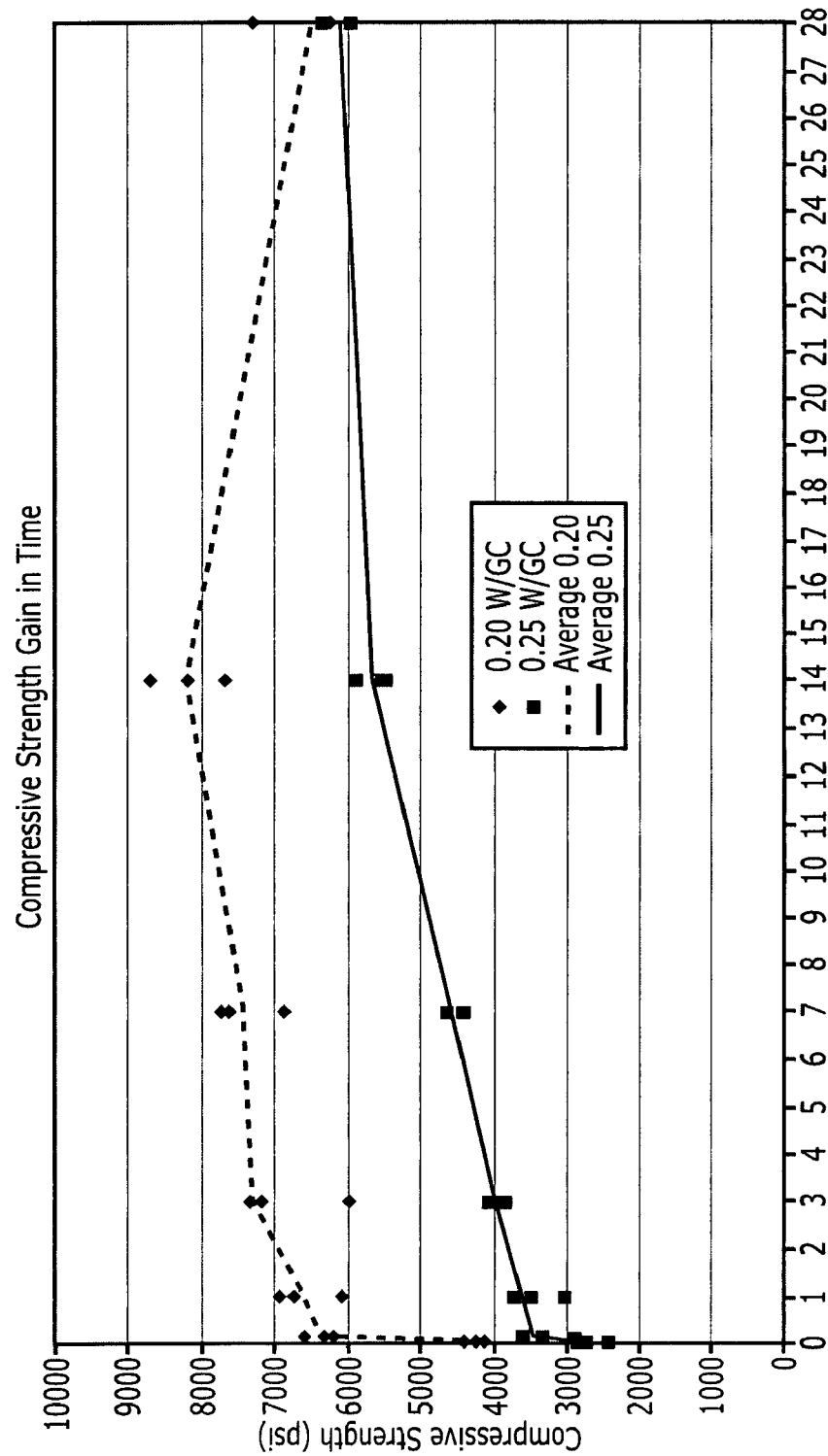
FIG. 2 is a graph of time course of compressive strengths for different water ratios of the mixture of the Example.

FIG. 2 illustrates the time course of compressions strengths for the invention at 20% and 25% water ratios. The compression strengths of the invention at 20% water increased sharply at 1 hour post mixing, 4238 psi, and increased gradually over time to day 14, 8197 psi. On day 28, the compression strength decreased significantly to 6515 psi for unknown reasons. The compression strengths for the invention samples using 25% water ratio started out lower than the 20% samples at 1 hour, 2683 psi, and gradually increased to 5628 psi on day 14. Unlike the samples at 20%, these samples increased in strength on day 28 to 6100 psi.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A sprayable and pourable cement composition comprising about 30 to 40 percent by weight calcium silicate, about 20 to 35 percent by weight magnesium oxide and about 25 to 40 percent by weight monopotassium phosphate, wherein said composition has a short cure time of five to fifteen minutes.

2. A substrate having the cement composition of claim 1 applied thereto.

3. The sprayable and pourable cement composition according to claim 1, further comprising an additive.

4. The sprayable and pourable cement composition according to claim 3, wherein the additive is kaolin.

5. A sprayable and pourable cement composition comprising 30 to 40 percent by weight calcium silicate, 20 to 35 percent by weight magnesium oxide and 25 to 40 percent by weight monopotassium phosphate, wherein said composition has a short cure time of five to fifteen minutes.

6. A substrate having the cement composition of claim 5 applied thereto.

7. The sprayable and pourable cement composition according to claim 5, further comprising an additive.

8. The sprayable and pourable cement composition according to claim 7, wherein the additive is kaolin.

* * * * *